Feb. 23, 1954    H. K. WIEMER    2,669,924
APPARATUS FOR THE PRODUCTION OF CHOCOLATE PASTES
READY FOR SUBESQUENT TREATMENT ON ROLL REFINERS
Original Filed March 7, 1950
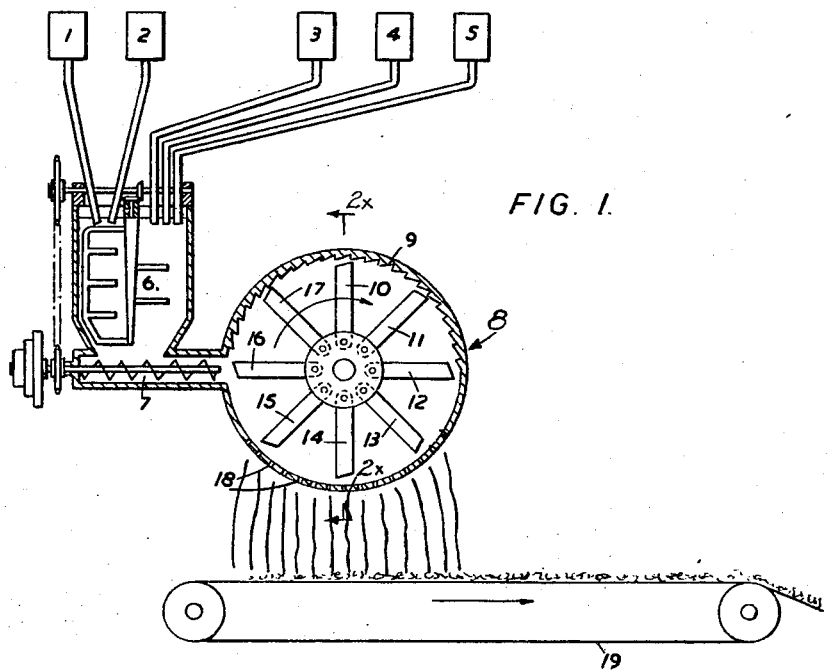
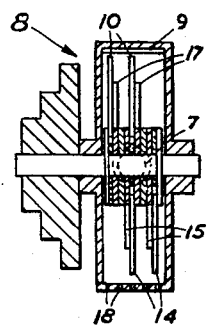
Inventor
Hermann Kurt Wiemer
By
Attorneys

UNITED STATES PATENT OFFICE 2,669,924

APPARATUS FOR THE PRODUCTION OF CHOCOLATE PASTES READY FOR SUBSEQUENT TREATMENT ON ROLL REFINERS

Hermann Kurt Wiemer, Wallington, England

Original application March 7, 1950, Serial No. 148,155. Divided and this application March 13, 1951, Serial No. 215,232

Claims priority, application Great Britain September 21, 1949

1 Claim. (Cl. 99—236)

This invention relates to apparatus for performing the process of making chocolate forming the subject of United States patent application Serial No. 148,155, dated March 7, 1950, of which the present application is a division.

The invention has for its object the provision of improved apparatus for the continuous production of chocolate pastes having varying contents of fat and of a consistency more suited for treating in refiners, the desired consistency being achieved by reducing the particle size of the sugar grains to the desired degree of fineness.

In the manufacture of chocolate the mixing together of the constituents before the grinding operation plays an important part. This mixing operation was previously carried out mainly in plate mixers, so-called melangeurs, or in trough mixers. Usually a large quantity of finely ground liquid cocoa was introduced into the mixer and then the sugar, which was mostly ground to the form of icing sugar, and the milk powder were admixed therewith. A mixing operation in such machines took from 20 to 40 minutes according to the content and required in addition much manual work. The mixed chocolate dough thus formed was carried in vessels or wagons to the grinding mill. As the latter operated continuously the hitherto known method of mixing naturally was replaced by continuously operating mixing devices.

However the attempts to solve the problem by using conveyor mixers and mill mixers did not, for various reasons, produce satisfactory results, and the results which had previously obtained with plate mixers were not attained.

The use of icing sugar moreover involved certain disadvantages. With intensive grinding in known high speed mills the flavour of the sugar was adversely affected presumably by the formation of ozone. Moreover the treatment of icing sugar endangered the health of the operators due to the inhaling of the sugar dust. Icing sugar moreover is very difficult to weigh automatically so that mechanical feeding of the mixers was almost impossible. For these reasons in certain manufacturing methods the grinding of the sugar before mixing was omitted but this rendered the provision of a set of grinding mills and remixing in melanguers more necessary than usual and consequently this method of operation was used less than it should have been used although it had another important advantage.

As is known both fats and sugar have the property of attracting and binding aromas to themselves. In the disintegration of the sugar in intimate contact with the cocoa a very extensive mutual enrichment of the aroma takes place. As is known good kinds of cocoa in the form of cocoa nibs are mixed with sugar in crystal form while not such good cocoa beans are mixed with sugar only after a treatment and grinding which improves the aroma. It has been found in practice that in all cases in order to produce a plastic chocolate paste particularly suitable for supply to the chocolate grinding mill involving care in the mixing, liquid cocoa should be employed since the consistency of the chocolate plays a large part in the attainment of good results in the grinding operation.

The consistency may be affected by the cocoa butter content and also by the size of the sugar particles. While the percentage content of the different chocolate constituents is determined by the recipe selected and the cocoa butter content is thus limited and affords no possibility of varying the viscosity, an important possibility is available by variation in the grain size of the sugar. This depends on the fact that a definite quantity of sugar formed of very many small sugar particles has a larger superficial area than the same quantity of sugar in the form of fewer and larger sugar particles.

With the knowledge that it is better in making chocolate to grind the chocolate with the minimum quantity of butter since in this way improvement in the aroma is obtained, and that the size of the sugar particles on delivery of the chocolate paste to the grinding mill need only be about 100 microns, it will be appreciated that a method of mixing and a continually operating apparatus therefor which takes into account the above-mentioned conditions offers an essential advantage especially where it is possible to make use of all the steps to provide for good aroma development.

In this invention the finely ground cocoa and cocoa butter on the one hand and sugar in crystal form and the milk powder on the other are automatically weighed and pre-mixed and then the mixing is completed in a high speed hammer mill, which at the same time disintegrates the sugar to the particular size corresponding to the paste consistency desired. Preferably the automatic weighing is carried out continuously. The hammer mill is fed by means of a conveyor regulatable in speed while to ensure intensive mixing the rotating, mixing and grinding members of the hammer mill are in the form of blades in alternate right and left hand spirals.

The invention is illustrated diagrammatically in the accompanying drawings in which Fig. 1 is a diagrammatic illustration partly in section of apparatus suitable for carrying the invention into effect. Fig. 2 is a section through the hammer mill on the line 2x—2x of Fig. 1, and Fig. 3 is a developed plan showing the arrangement of the blades of the hammer mill in alternate right and left hand spirals.

Referring to the drawing, 1 and 2 indicate the weighing devices for the dry pulverulent substances such as sugar in crystal form and milk powder, 3, 4 and 5 indicate weighing devices or metering pumps for liquid or semi-liquid material such as cocoa liquor, cocoa butter; lecithin and crushed or ground nut materials. These weighing devices are suitably arranged for continuous weighing of very small quantities or for weighing in a continuous flow. 6 indicates a suitable mixer of known type with a vertical mixing shaft in which the materials are pre-mixed to form a fluid mixture. 7 indicates a conveyor worm which can be driven at different speeds. At high speeds due to the greater throughput to the mill the sugar is not so finely ground as it is when the speed is lower.

8 indicates a hammer mill the casing of which is provided on its upper inner side with serrations or teeth 9 and is provided on its lower side with holes 18 providing a form of sieve through which the material is discharged. 10—17 indicate the blade like hammers which rotate at a more or less high speed. The blade-like hammers are carried by a rotor mounted on a shaft extending axially through the casing, the shaft being driven by a variable speed pulley, as shown.

The mass fed by the conveyor worm 7 into the hammer mill casing passes between these hammers and due to the disposition of the hammers in right and left hand spirals indicated in Figs. 2 and 3, is subjected to an intensive mixing operation. Under the action of centrifugal force the mixed chocolate mass passes between the tips of the blades 10—17 and the serrations or teeth 9 where the sugar in crystal form is reduced to the desired degree of fineness.

The ground and mixed mass passes through the sieve holes 18 and falls on the conveyor band 19 on which it is transported direct to a chocolate refiner.

I claim:

An apparatus for the continuous production of chocolate pastes having the desired degree of fineness for subsequent treatment on roll refiners, comprising a premixing device of small dimensions, means for automatically separately and continuously weighing and supplying to said premixing device in small quantities predetermined relative proportions of ground cocoanut, cocoanut butter, sugar in crystal form and milk powder, a hammer mill including a cylindrical casing, a rotor in said casing mounted on a shaft extending axially in the casing, a circular series of peripherally spaced blade-like hammers carried by the rotor each extending radially in the casing to a point adjacent the inner periphery thereof, each successive blade-like hammer of one portion of the series being offset axially in one direction with respect to the next preceding peripherally spaced hammer of said portion of the series of hammers, each succeeding hammer of the remaining portion of the hammers of the series being offset axially in the opposite direction with respect to the next preceding peripherally-spaced hammer of said remaining portion of the series of hammers whereby the series of peripherally-spaced hammers are arranged in spiral segments with opposite slopes, means in the upper part of the casing including serrations cooperating with the hammers in the grinding of the chocolate paste, the lower portion of the casing being provided with holes for the discharge of chocolate paste from the casing, means for continuously feeding premixed chocolate paste from said premixing device into the hammer mill, and means for varying the speed of the feeding means.

HERMANN KURT WIEMER.

References Cited in the file of this patent

UNITED STATES PATENTS

| Number | Name | Date |
|---|---|---|
| 589,236 | Williams | Aug. 31, 1897 |
| 680,889 | Schutz | Aug. 20, 1901 |
| 1,591,979 | Iff | July 13, 1926 |
| 1,759,448 | Frickey | May 20, 1930 |
| 1,930,623 | Peterson | Oct. 17, 1933 |
| 1,973,074 | Howes | Sept. 11, 1934 |
| 2,348,916 | Magnus | May 16, 1944 |
| 2,417,184 | Wagner | Mar. 11, 1947 |
| 2,515,150 | Aasted | July 11, 1950 |
| 2,587,372 | Oliver | Feb. 26, 1952 |

FOREIGN PATENTS

| Number | Country | Date |
|---|---|---|
| 139,682 | Austria | Dec. 10, 1934 |
| 259,673 | Germany | May 10, 1913 |
| 261,554 | Italy | Dec. 1, 1928 |
| 634,856 | Germany | Sept. 4, 1936 |